(12) United States Patent
Hellstrom et al.

(10) Patent No.: US 11,597,661 B2
(45) Date of Patent: Mar. 7, 2023

(54) INTERCALATION-BASED MATERIALS AND PROCESSES FOR SOFTENING WATER

(71) Applicant: Robert Bosch GmbH, Stuttgart (DE)

(72) Inventors: Sondra Hellstrom, Palo Alto, CA (US); Michael Metzger, Sunnyvale, CA (US); Saravanan Kuppan, Sunnyvale, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 606 days.

(21) Appl. No.: 16/670,049

(22) Filed: Oct. 31, 2019

(65) Prior Publication Data

US 2020/0148560 A1 May 14, 2020

Related U.S. Application Data

(60) Provisional application No. 62/760,862, filed on Nov. 13, 2018.

(51) Int. Cl.
| | |
|---|---|
| *C02F 1/461* | (2006.01) |
| *C02F 5/00* | (2006.01) |
| *C25B 13/00* | (2006.01) |
| *C25B 11/043* | (2021.01) |
| *C25B 11/077* | (2021.01) |
| *C02F 1/46* | (2006.01) |
| *C02F 1/469* | (2006.01) |

(52) U.S. Cl.
CPC ........ *C02F 1/46109* (2013.01); *C02F 1/4602* (2013.01); *C02F 1/4691* (2013.01); *C02F 1/46104* (2013.01); *C02F 5/00* (2013.01); *C25B 11/043* (2021.01); *C25B 11/077* (2021.01); *C25B 13/00* (2013.01); *C02F 2001/46133* (2013.01); *C02F 2001/46138* (2013.01); *C02F 2001/46161* (2013.01); *C02F 2201/46115* (2013.01)

(58) Field of Classification Search
None
See application file for complete search history.

(56) References Cited

U.S. PATENT DOCUMENTS

| 9,077,032 B2 | 7/2015 | Doe et al. |
| 9,670,077 B2 | 6/2017 | Volkel et al. |
| 9,758,391 B2 | 9/2017 | Yang et al. |
| (Continued) | | |

FOREIGN PATENT DOCUMENTS

CN          106186458 A     * 12/2016

OTHER PUBLICATIONS

Logan et al, Low Energy Desalination Using Battery Electrode Deionization, Environ. Sci. Technol. Letts., 2017, 4, 444-449 (Year: 2017).*
Gheytani et al., An Aqueous Ca-Ion Battery, Advanced Science, 2017, 4, 1700465, pp. 1-7.
(Continued)

*Primary Examiner* — Salil Jain
(74) *Attorney, Agent, or Firm* — Maginot, Moore & Beck LLP

(57) ABSTRACT

A device for removing ions from a flow of water includes a first electrode and a counter-electrode opposite the first electrode in the flow of water. The first electrode contains at least one material which is capable of intercalating one or both of $Mg^{2+}$ and $Ca^{2+}$ ions in the flow of water. The counter-electrode can include a material capable of binding to anions in the flow of water.

15 Claims, 4 Drawing Sheets

(56) References Cited

U.S. PATENT DOCUMENTS

| | | | |
|---|---|---|---|
| 2011/0162965 A1* | 7/2011 | Kim | C02F 1/4691 204/632 |
| 2013/0244100 A1 | 9/2013 | Tan et al. | |
| 2015/0175449 A1* | 6/2015 | Yang | C02F 1/4691 204/660 |
| 2015/0244031 A1* | 8/2015 | Adamson | H01M 4/50 429/188 |
| 2015/0274555 A1* | 10/2015 | Volkel | C02F 1/4604 205/746 |
| 2016/0141616 A1 | 5/2016 | Seo et al. | |
| 2018/0148355 A1 | 5/2018 | Smith et al. | |
| 2018/0241090 A1 | 8/2018 | Takami et al. | |

OTHER PUBLICATIONS

Kim et al., Low Energy Desalination Using Battery Electrode Deionization, Environmental Science and Technology Letters, 2017, 4, pp. 444-449.

Liu et al., Quantifying the Trade-offs between Energy Consumption and Salt Removal Rate in Membrane-free Cation Intercalation Desalination, Electrochimica Acta, vol. 271, May 1, 2018, pp. 652-665.

Porada et al., Nickel Hexacyanoferrate Electrodes for Continuous Cation Intercalation Desalination of Brackish Water, Electrochimica Acta, vol. 255, Nov. 20, 2017, pp. 369-378.

Senthilkumar et al., Synthesis and Electrochemical Performances of Maricite-NaMPO4 (M=Ni, Co, Mn) Electrodes for Hybrid Supercapacitors, RSC Advances, Sep. 19, 2014, pp. 1-10.

Song et al., Removal of Interstitial H2O in Hexacyanometallates for a Superior Cathode of a Sodium-Ion Battery, Journal of the American Chemical Society, 2015, 137, pp. 2658-2664.

Suss et al., Water Desalination with Energy Storage Electrode Materials, Joule, vol. 2, Issue 1, Jan. 17, 2018, pp. 10-15.

Yun et al., Electrochemically Formed NaxMn[Mn(CN)6] Thin Film Anodes Demonstrate Sodium Intercalation and Deintercalation at Extremely Negative Electrode Potentials in Aqueous Media, ACS Applied Energy Materials, 2018, 1, pp. 123-128.

Yun et al., MgFeSiO4 prepared via a molten salt method as a new cathode material for rechargeable magnesium batteries, Chinese Science Bulletin, Feb. 2011, vol. 56, No. 4-5, pp. 386-390.

Gao et al., An Aqueous Symmetric Sodium-Ion Battery with NASICON-Structured Na3MnTi(PO4)3, Angewandte Chemie International Edition, 2016, vol. 55, pp. 12768-12772.

Kim et al., Na2FeP2O7 as a Novel Material for Hybrid Capacitive Deionization, Electrochimica Acta, vol. 203, Jun. 10, 2016, pp. 265-271.

Lui et al., Electrodeposited Manganese Dioxide/Activated Carbon Composite as a High-Performance Electrode Material for Capacitive Deionization, ACS Sustainable Chem. Eng. 2016, 4, 9, 4762-4770.

Srimuk et al., Titanium Disulfide: A Promising Low-Dimensional Electrode Material for Sodium Ion Intercalation for Seawater Desalination, Chem. Mater. 2017, 29, 23, 9964-9973.

Yee et al., TiP2O7 exhibiting reversible interaction with sodium ions in aqueous electrolytes, Electrochemistry Communications, vol. 86, Jan. 2018, pp. 104-107.

* cited by examiner

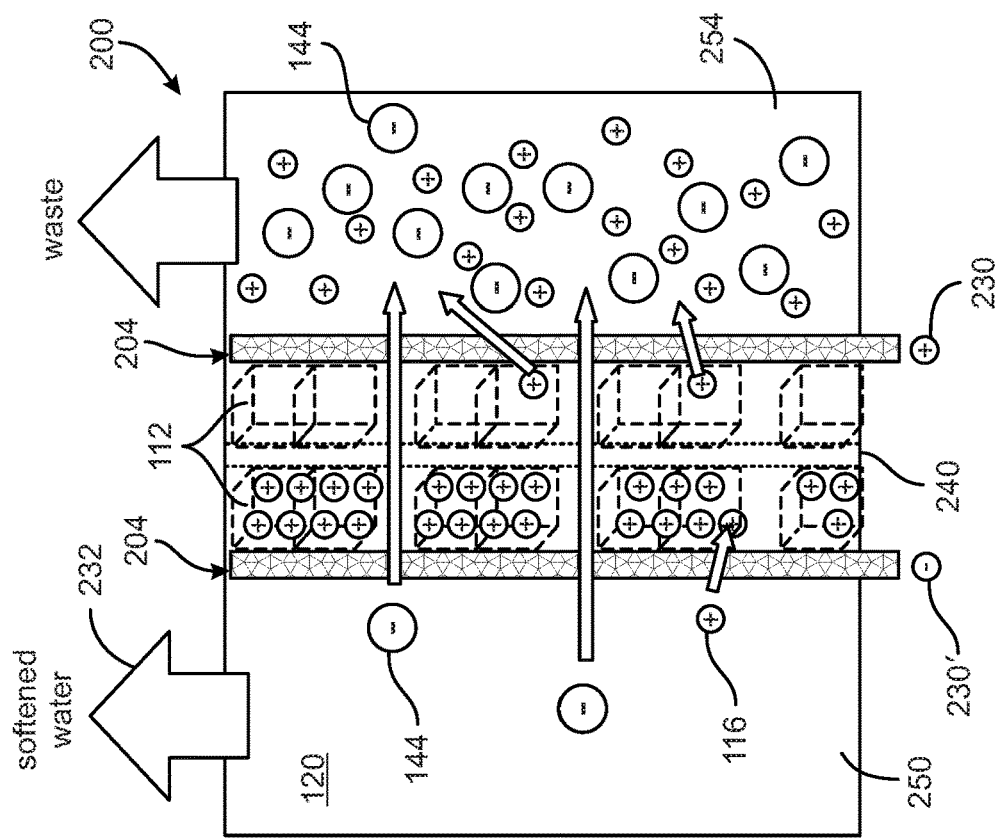
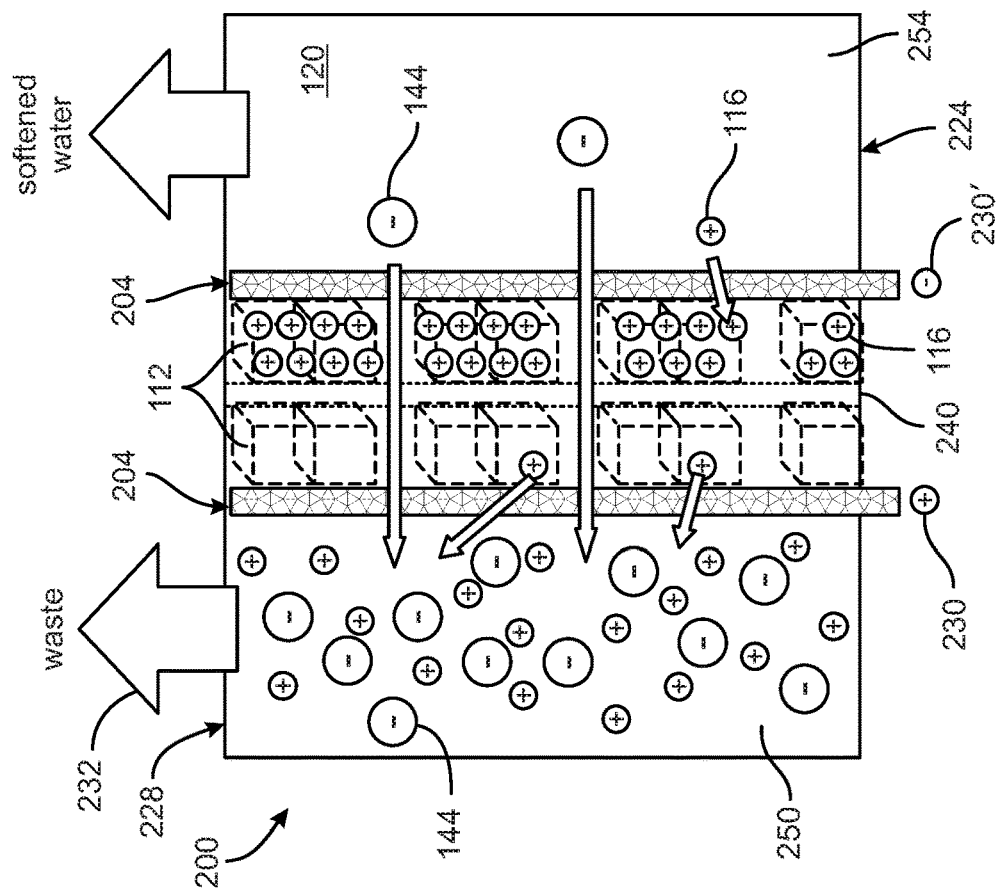

INTERCALATION-BASED MATERIALS AND PROCESSES FOR SOFTENING WATER

PRIORITY CLAIM

This application is a utility filing from and claims priority to U.S. Provisional Application No. 62/760,862, filed on Nov. 13, 2018, and entitled "Intercalation-based materials and processes for softening water", the entire disclosure of which is incorporated herein by reference.

FIELD

The disclosure relates to electrochemical treatment of water and more particularly to water softening devices that incorporate electrode materials configured to intercalate target ions.

BACKGROUND

Water from traditionally safe sources such as municipal water sources or potable water from wells may nonetheless possess qualities that are less desirable to the water consumer. For instance, water from potable water sources can vary significantly with respect to taste, odor, turbidity, bacterial and/or viral contamination, heavy metal contamination, hardness, mineral deposits, and/or a combination of these water quality parameters. The quality parameter of water hardness relates to the concentration of calcium ions ($Ca^{2+}$) and/or magnesium ions ($Mg^{2+}$) present in a given volume of water. Calcium and/or magnesium exist in potable water in the form of salts, which are normally soluble in the form of sulfates, carbonates, bicarbonates, or chlorides. The soluble salts are often ionized so that the water contains a relatively high concentration of calcium ions and/or magnesium ions.

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. The process of removing calcium ions and/or magnesium ions from hard water is commonly referred to as water softening.

There are a variety of existing techniques for removing ions from water, each with advantages and disadvantages that make the different technologies more or less desirable for a given application. Reverse osmosis (RO) and modern thermal distillation are techniques that are effective at comprehensive, non-selective removal of ions from water (i.e., deionization). Since these techniques remove water from salts, they are most advantageous when the initial ion load is quite high such as in the case of seawater desalination. However, RO and thermal distillation techniques suffer from generally high cost due to the significant energy inputs required. Another technique for removing ions from water includes electrochemical technologies such as electrodialysis or electro-absorption (i.e., capacitive deionization). These techniques typically remove ions from feed water using ion-exchange membranes and/or high-surface-area carbon in connection with an applied potential to attract ions out of the water to an electrode and to limit desorption. Therefore, electrodialysis and electro-absorption are more attractive for brackish water sources or applications that require partial removal of ions from a water stream.

The most common technology for municipal water softening is ion exchange. In an ion exchange softening system, the softening device when active uses an ion-exchange resin to replace calcium ions and magnesium ions in a feed water stream with sodium ions. Though ion exchange systems can recover slightly more water than CDI systems, and energy consumption in an ion exchange system is generally lower than with a CDI system, ion exchange does have some disadvantages. Softened water can taste salty since calcium and magnesium ions are replaced with sodium ions. Additionally, ion exchange systems must be periodically recharged with sodium ions. This requires a user to routinely add salt to the system to maintain system efficiency, which can be a burden to the user. Furthermore, brine waste streams in areas with significantly hard water can create a burden on local water treatment plants and on the environment. Some municipalities have banned salt-adding water softeners altogether because of this burden.

Another technique for removing ions from water includes the addition of intercalation hosts to electro-absorption platforms to form a "desalination battery" or similar hybrid systems. The addition of intercalation hosts to electro-absorption platforms provides many advantages. For instance, a system using intercalation hosts can have higher available capacities than carbon-based capacitive deionization (CDI) systems, which improves efficiency and reduces electrode wear. Additionally, since intercalation hosts do not rely on high surface area to achieve high capacity, they are less susceptible to fouling than typical CDI electrodes. Furthermore, intercalation compounds are configurable to remove specific targeted ions from a water stream, which is advantageous when water meets most, but not all, quality criteria for a given application.

The use of intercalation hosts in CDI systems has been traditionally limited by lack of availability of materials that: (1) intercalate ions of relevance, such as sodium ions ($Na^+$); (2) have sufficient capacity in the potential window provided by aqueous electrolyte; (3) are nontoxic; and (4) have appropriate cycle life to purify a reasonable amount of water before electrode regeneration or replacement is required. However, Applicant has discovered that water softening is an application that is well-suited to the use of intercalation hosts. Municipal water often contains greater than optimal concentrations of calcium and magnesium ions, but the water is otherwise potable. Therefore, a water treatment or water softening system that utilizes intercalation hosts to selectively extract only the ions of interest will be most energy efficient. In contrast, since hard water is prone to leaving mineral deposits on surfaces, conventional carbon-based CDI systems can be difficult to implement. Furthermore, municipal hard water frequently contains approximately 200 ppm divalent cations, which is typically too low to justify energy-intensive purification techniques such as RO or distillation-based technologies.

What is needed are suitable intercalation host materials for softening water that selectively intercalate ions of relevance, have sufficient capacity in the stability window of the aqueous environment in which they are implemented, are nontoxic, and have a long cycle life. A water softening device that includes at least one electrode with such an intercalation host material would be further advantageous.

SUMMARY OF THE DISCLOSURE

In one aspect of the disclosure, a device is provided for removing ions from a flow of water. The device comprises a first electrode connectable to a current source and a counter-electrode connectable to the current source and arranged in the flow of water opposite the first electrode. In one feature, the first electrode contains at least one material which is capable of intercalating one or both of $Mg^{2+}$ and $Ca^{2+}$ ions in the flow of water. The material can be selected from the group consisting of: $A_xCuFe(CN)_6$ (A=Li,Na,K,Cs) $0 \le x \le 1$; $A_xMnFe(CN)_6$ (A=Li,Na,K,Cs) $0 \le x \le 1$; $A_xMnMn(CN)_6$ (A=Li,Na,K,Cs) $0 \le x \le 1$; $A_xZnFe(CN)_6$ (A=Li,Na,K,Cs) $0 \le x \le 1$; $A_xBaFe(CN)_6$ (A=Li,Na,K,Cs) $0 \le x \le 1$; $A_xFeFe(CN)_6$ (A=Li,Na,K,Cs) $0 \le x \le 1$; $A_xNiFe(CN)_6$ (A=Li,Na,K,Cs) $0 \le x \le 1$; $Ti_xFe_{1-x}[Fe(CN)_6]_{0.96}$ $0 \le x \le 1$; polyimide; $FePO_4$; $NaMnFe_2(PO_4)_3$; $Na_3Fe_3(PO_4)_4$; $Na(M)PO_4$, M=Fe, Mn, or $Fe_xMn_{1-x}$ $0 \le x \le 1$; $MnO_2$; $Na_xMnO_2$, $0 \le x \le 1$; $ZnMn_2O_4$; $MgFeSiO_4/C$; $Mg_xMn_{2-x}SiO_4$, $0 \le x \le 2$; $Mg_{0.5}Ti_2(PO_4)_3$; $LiTi_2(PO_4)_3$; $Ti_xAl_{2-x}(PO_4)_3$, $0 \le x \le 2$; $TiP_2O_7$; $Na_3MnTi(PO_4)_3$; $K_2Ti_4O_9$; $TiS_2$; $FeS_2$; $CaMO_3$ (M=Mn and/or Fe); potassium terephthalate; 2,5-pyridinedicarboxylate ($K_2PC$); $KFeF_3$; $K_{0.3}MnO_2$; $KMg_xFe_{2-x}(PO_4)_2$, $0 \le x \le 2$; $NaTi_2(PO_4)_3$; $Na_2FeP_2O_7$, $TiO_2$, and $Na_2Ti_3O_7$.

In another aspect of the disclosure, a method for removing ions from a flow of water includes positioning the device in a flow of water and applying a negative voltage to the first electrode, in one operating state, to intercalate the ions from the flow of water into the first electrode. In certain embodiments, a positive voltage is applied to the counter-electrode which is configured to bind anions in the flow of water, thereby producing an ion-free flow of water discharged from the device. In another operating state, a positive voltage is applied to the first electrode to release the intercalated ions back into a flow of water to produce a flow of waste water discharged from the device.

BRIEF DESCRIPTION OF THE DRAWINGS

FIG. 5 depicts a water softening device according to a second embodiment, the device shown in a first operating state in which a voltage is applied to a first electrode with a first material and to a second electrode with a second material, the first material configured to intercalate target cations from a water supply and the second material configured to release the target cations to a wastewater stream.

FIG. 6 illustrates the water softening device of FIG. 5 in a second operating state in which the voltage polarity is reversed, the first material configured to release the target cations to the wastewater stream and the second material configured to intercalate the target cations from the water supply.

DETAILED DESCRIPTION

Figure 1:
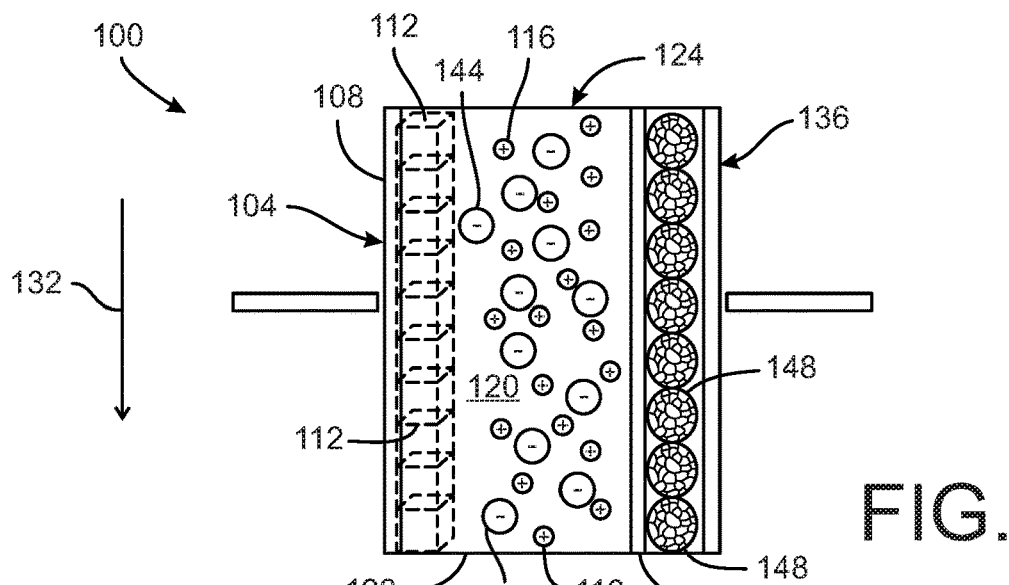
FIG. 1 depicts a water softening device according to a first embodiment, the device including an electrode with at least one material configured to intercalate target cations in a water supply.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
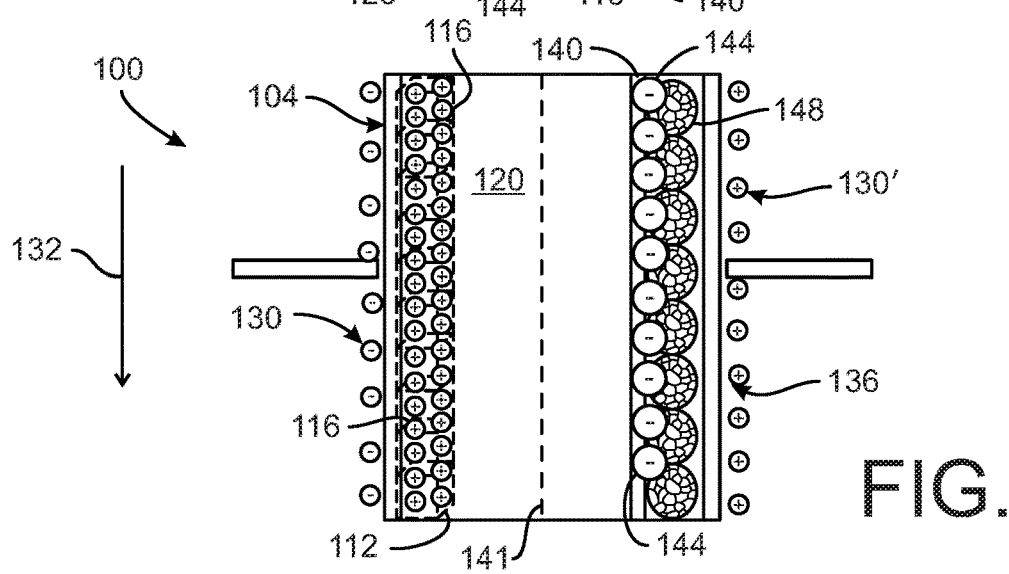
FIG. 2 illustrates the water softening device of FIG. 1 in an operating state in which a voltage is applied to the electrode and the target cations are removed from the water supply via intercalation with the material.
Figure 3:
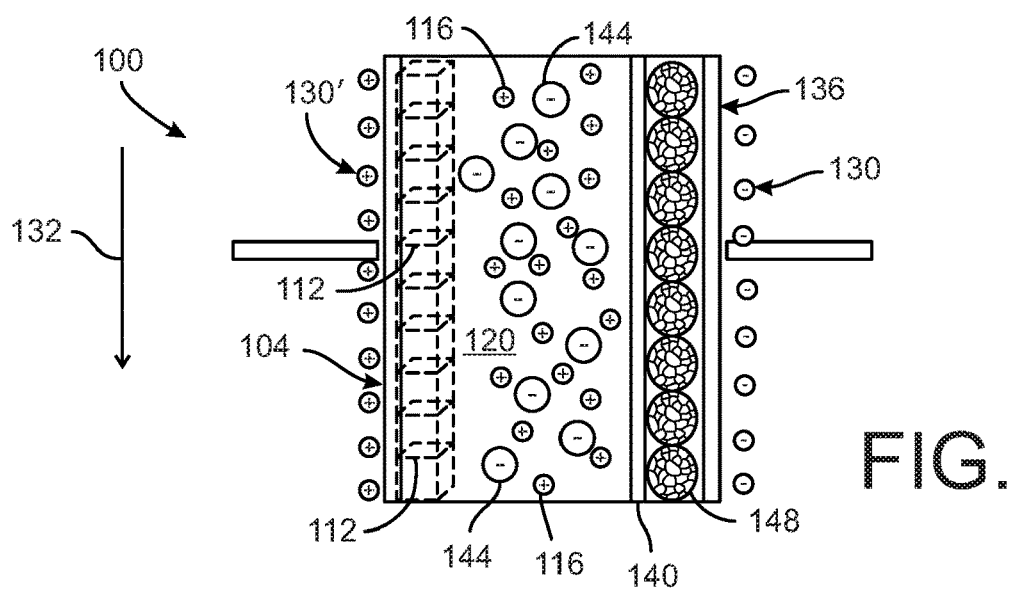
FIG. 3 illustrates the water softening device of FIG. 1 in an operating state in which the voltage applied to the electrode is reversed and the target cations are released into a wastewater stream.

FIGS. 1-3 depict a first embodiment of a device 100 for softening water. The device 100 includes at least one electrode 104 and a counter-electrode 136. The electrode 104 can have a substrate 108 with at least one material 112 disposed on the substrate 108. In one embodiment, the substrate 108 is a metal substrate. The material 112 on the substrate includes an intercalation host material configured to intercalate one or more first target ions 116 from a flow of water 120. In the illustrated embodiment, the intercalation host material 112 can be configured to intercalate with one or both of the divalent cations $Ca^{2+}$ and $Mg^{2+}$ as the first target ions, although in other embodiments the first target ions 116 can be other target ions. The water flow 120 can also include other cations and anions.

The intercalation host material 112 of the electrode 104 disclosed herein is one or more of the compounds identified in Table 1 below:

TABLE 1

$A_xCuFe(CN)_6$, where A = Li, Na, K, Cs and $0 \le x \le 1$
$A_xMnFe(CN)_6$, where A = Li, Na, K, Cs and $0 \le x \le 1$
$A_xMnMn(CN)_6$, where A = Li, Na, K, Cs and $0 \le x \le 1$
$A_xZnFe(CN)_6$, where A = Li, Na, K, Cs and $0 \le x \le 1$
$A_xBaFe(CN)_6$, where A = Li, Na, K, Cs and $0 \le x \le 1$
$Ti_xFe_{1-x}[Fe(CN)_6]_{0.96}$, where $0 \le x \le 1$
Polyimide (PNDIE)
$FePO_4$
$NaMnFe_2(PO_4)_3$ Alluaudite
$Na_3Fe_3(PO_4)_4$
$Na(M)PO_4$, where M = Fe, Mn, or $Fe_xMn_{1-x}$ and $0 \le x \le 1$
$MnO_2$
$Na_xMnO_2$, where $0 \le x \le 1$
$ZnMn_2O_4$
$MgFeSiO_4/C$
$Mg_xMn_{2-x}SiO_4$, where $0 \le x \le 2$
$Mg_{0.5}Ti_2(PO_4)_3$
$LiTi_2(PO_4)_3$
$Ti_xAl_{2-x}(PO_4)_3$, where $0 \le x \le 2$
$TiP_2O_7$
$Na_3MnTi(PO_4)_3$
$K_2Ti_4O_9$
$TiS_2$
$FeS_2$
$CaMO_3$, where M = Mn and/or Fe
potassium terephthalate
2,5-pyridinedicarboxylate ($K_2PC$)
$KFeF_3$
$K_{0.3}MnO_2$
$KMg_xFe_{2-x}(PO_4)_2$, where $0 \le x \le 2$
$A_xFeFe(CN)_6$, where A = Li, Na, K, Cs and $0 \le x \le 1$ TABLE 1-continued $A_x NiFe(CN)_6$, where A = Li, Na, K, Cs and $0 \leq x \leq 1$
$NaTi_2(PO_4)_3$
$Na_2FeP_2O_7$
$TiO_2$
$Na_2Ti_3O_7$ In one embodiment, the electrode 104 includes material 112 disposed on the substrate 108 includes one or more of the intercalation host materials from Table 1, a carbon additive to improve electrical conductivity, and a binder. In one specific embodiment, the intercalation host materials are provided in an amount 60-85 wt %, the carbon additive provided in an amount 3-10 wt %, and a polyvinylidene di-fluoride (PVDF) is provided as the binder in an amount 5-35 wt %. To produce the electrode 104 having the intercalation host material 112, the carbon additive, and the polymeric binder are well-mixed as a slurry in an appropriate solvent, such as N-Methyl-2-Pyrrolidone (NMP), and then blade-cast, roll cast, or airbrushed onto the substrate 108 of the electrode 104.

The device 100 in some embodiments is arranged in a water supply system for a dwelling or other building (not shown) that includes various pumps, conduits, valves, and related components to transport water from an external water supply to water distribution branch circuits within the dwelling or building. Water flow 120 enters the device 100 at an input side 124 and exits the device 100 at an output side 128. The device 100 can be incorporated into a housing having an inlet, at the input side 124 of the device, which is in fluid-tight engagement with an input line connected to the external water supply, and an outlet, at the output side 128 of the device, which is in fluid-tight engagement with an inlet to the water distribution branch circuits.

As the water moves in a flow direction 132 through the device 100 and over the intercalation host material 112 on the electrode 104, the device 100 is configured to have different operating states so as to enable it to selectively remove the first target ions 116 from the water flow 120. The flow direction 132 shown in FIGS. 1-3 is for reference only and can be reversed in other embodiments. If the flow direction is reversed, the locations of the input side 124 and the output side 128 of the device will be reversed as well.

FIG. 1 illustrates the device 100 in a first operating state in which no voltage is applied to the electrode 104 while the water 120 flows through the device 100. In this first operating state, the intercalation host material 112 of the device 100 has virtually no effect on the ions in the water so the water 120 is unchanged as it enters the input side 124 and exits the output side 128. Likewise, the intercalation host material 112 also has virtually no effect on the ions when the water 120 is not flowing through the device.

FIG. 2 illustrates the device 100 in a second operating state in which a negative voltage 130 is applied to the electrode 104 while the water 120 flows through the device 100 in the flow direction 132. In the second operating state, the first target ions 116 are intercalated into the intercalation host material 112. The water that exits the output side 128 of the device 100 when the device is operated in the second operating state will contain a lower concentration of the first target ions 116 than the water that enters the input side 124 of the device 100. In the embodiment in which the first target ions 116 are one or both of the divalent cations $Ca^{2+}$ and $Mg^{2+}$, the water 120 exiting the device 110 will be softened water. The second operating state of the device 100 is sometimes referred to as a "purification cycle" since the removal of the first target ions 116 purifies the water stream exiting the device 100.

FIG. 3 illustrates the device 100 in a third operating state in which the voltage polarity is reversed and a positive voltage 130' is applied to the electrode 104 while the water 120 flows through the device in the flow direction 132. In the third operating state, the first target ions 116 are released from the intercalation host material 112 back into the water 120 flowing past the electrode 104. The water 120 that exits the output side 128 of the device 100 when the device is operated in the third operating state is typically referred to as the wastewater stream since it will contain a higher concentration of the first target ions 116 than the water that enters the input side 124 of the device. The third operating state of the device 100 is sometimes referred to as a "regeneration cycle" since the intercalation host material 112 is cleared of the first target ions 116 in preparation for a subsequent purification cycle.

The voltage applied to the electrode 104 in the second and third operating states is configured to be within the stability window of water (i.e., −0.401 to +1.23 V vs. SHE) so as to avoid water electrolysis. As such, the intercalation host materials 112 identified in Table 1 are configured to intercalate and release the first target ions 116 at voltages within the stability window of water.

With continued reference to FIGS. 1-3, in some embodiments the second electrode 136 is configured to remove second target ions 144. The second electrode 136 is spaced apart from the first electrode 104 on the opposite side of the water flow path 120. In the illustrated embodiment, the first and second electrodes are directly across from each other in the flow path; however, the electrodes can be offset from each other in the flow direction 132. In one embodiment, the second electrode 136 can be configured as a high-surface-area carbon counter-electrode. The device 100 in some embodiments also includes at least one ion-selective membrane 140 disposed between the second electrode 136 and the water 120. The ion-selective membrane 140 is configured to pass second target ions 144 and to improve resistance to co-ion adsorption. The device 100 in some embodiments can include a water-permeable separator 141 disposed in the water flow 120 (see FIG. 2) that prevents electrical contact between the electrodes. The separator 141 can be a nylon mesh or other non-conductive material, non-toxic material. When paired with the electrode 104, the second electrode 136 is configured in at least one operating state to selectively remove one or more second target ions 144 from the water 120 via electro-adsorption onto a porous carbon layer 148 through the ion exchange membrane 140. The second target ions 144 in the illustrated embodiment can be the anions $Cl^-$ or $CO_3^{2-}$, although in other embodiments the second target ions 144 can be other target ions.

When the device 100 is in the first operating state as shown in FIG. 1, no voltage is applied to the second electrode 136 while the water 120 flows through the device 100. In this first operating state, the second electrode 136 has virtually no effect on the ions in the water 120 so the water is unchanged as it enters the input side 124 and exits the output side 128. Likewise, the second electrode 136 also has virtually no effect on the ions in the water 120 when the water is not flowing through the device.

When the device 100 is in the second operating state as shown in FIG. 2, a positive voltage 130' is applied to the second electrode 136 while the water 120 flows through the device in the flow direction 132. In the second operating state, the second target ions 144 are accumulated at the second electrode 136. The water that exits the output side 128 of the device 100 when the device is operated in the second operating state will contain a lower concentration of the second target ions 144 than the water that enters the input side 124 of the device 100. In this second operating state, a negative voltage is applied to the first electrode 104 to intercalate the first target ions 116, as described above.

When the device 100 is in the third operating state as shown in FIG. 3, the voltage polarity is reversed and a negative voltage 130 is applied to the second electrode 136 while the water 120 flow through the device in the flow direction 132. In the third operating state, the second target ions 144 are released from the second electrode 136 back into the water 120 flowing past the electrode 136. The water that exits the output side 128 of the device 100 when the device is operated in the third operating state will typically contain a higher concentration of the second target ions 144 than the water that enters the input side 124 of the device 100. The voltage applied to the second electrode 136 in the second and third operating states is configured to be within the stability window of water (i.e., −0.401 to +1.23 V vs. SHE) so as to avoid water electrolysis. As described above, In this third operating state, a positive voltage is applied to the first electrode 104 to release the first target ions 116.

In some embodiments, the electrode 104 can be paired with one more auxiliary electrodes that reversibly react with other ions. For instance, the auxiliary electrode(s) can be formed from materials such as Ag/AgCl or BiOCl that reversibly react with chloride ions.

Figure 4:
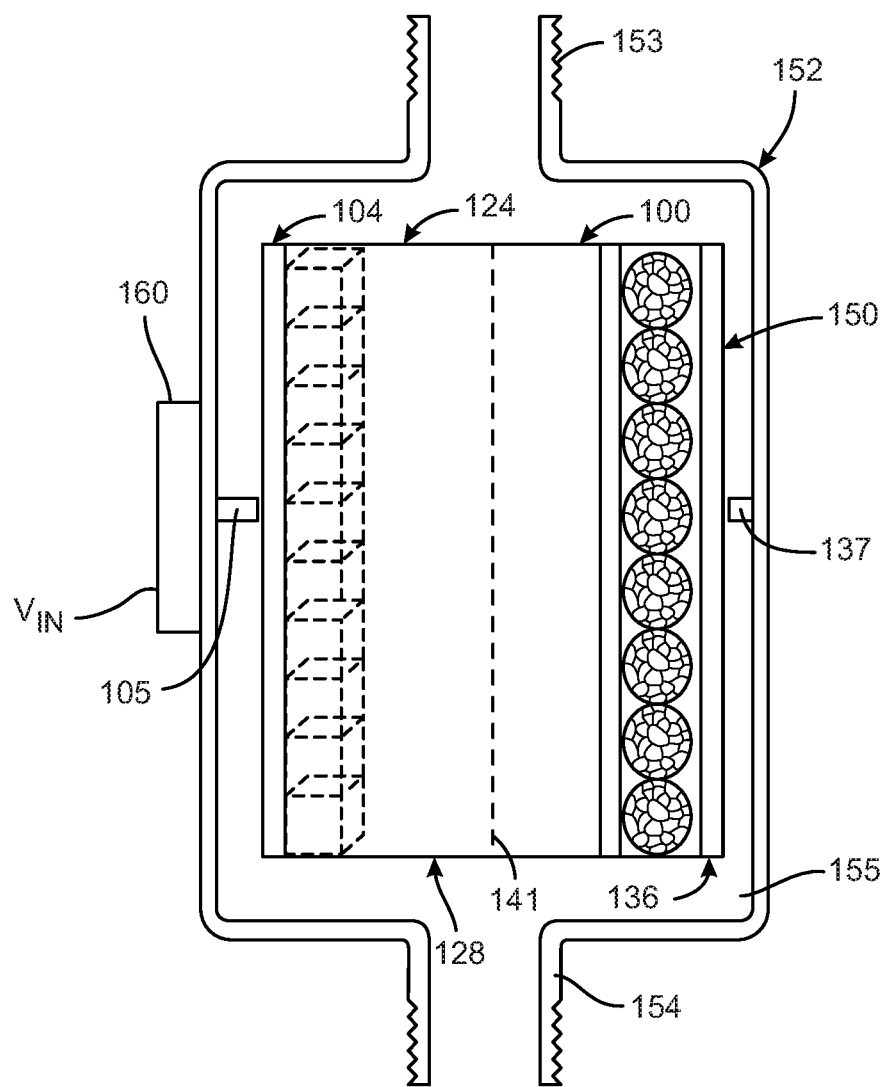
FIG. 4 depicts a cartridge embodiment of the device shown in FIGS. 1-3 in which the cartridge is supported within a housing integrated into a water supply system for a dwelling or building.

In one embodiment, the device 100 can be provided in the form of a cartridge 150 mounted within a housing 152, as illustrated in FIG. 4. The housing 152 includes an inlet fitting 153 adapted for fluid-tight engagement to a water inlet from the external water source, an outlet fitting 154 adapted for fluid-tight engagement to an inlet for a water distribution branch circuits of the dwelling or building, and an interior chamber 155 in which the cartridge 150 is received. The cartridge 150 can be replaceable. The housing 152 includes a controller 160 that is electrically connected to a current source $V_{IN}$ and to the electrodes 104, 136 by respective electrical conductors 105, 137. The controller 160 is configured and operable to selectively energize the two electrodes 104, 136 to achieve each of the three operating states of the device 100 described above. The controller can be an analog or digital device that is capable of selectively connecting the two electrodes to the current source $V_{IN}$. In one simple embodiment, the controller is a three-position switch that allows an operator to selectively place the device 100 in any of the three states. However, the controller 160 is can incorporate a clock and/or timer that initiates each of the three operating states according to a particular schedule. The controller can also be programmable or configured to initiate any of the three operating states based on particular conditions in the water supply or based on water usage.

FIGS. 5 and 6 depict a second embodiment of a device 200 for softening water. The device 200 includes two porous electrodes 204 that are configured in essentially the same manner as the electrode 104 described with reference to FIGS. 1-3. Therefore, the two electrodes 204 of the device 200 each include the intercalation host material 112 (Table 1), which is configured to intercalate the first target ions 116 from the water supply 120. The device 200 further includes an ion exchange membrane 240 disposed between the two electrodes 204. The ion exchange membrane in the embodiment shown is an anion exchange membrane 240 that facilitates separation of the first target ions 116 into a first region 250 of the device 200 that is occupied by one of the electrodes 204 and a second region 254 of the device 200 that is occupied by the other of the electrodes 204. The anion exchange membrane 240 is configured to permit other ions, such as the second target ions 144, to freely pass through the anion exchange membrane between the first and second regions. The configuration of the device 200 with the two electrodes 204 and the anion exchange membrane 240 obviates the need for a dedicated electrode to accumulate anions.

The device 200 in some embodiments is arranged in a water supply system (not shown) that includes various pumps, conduits, valves, and related components to transport water from a source to an end user. The device 200 is arranged in the water supply system such that the water 120 enters the device 200 at an input side 224 and exits the device 200 at an output side 228. As the water moves in a flow direction 232 through the device 200 and over the intercalation host material 112 on the electrodes 204, the device 200 is configured to have different operating states so as to enable it to selectively remove the first target ions 116 from the water 120.

FIG. 6 illustrates the device 200 in a first operating state in which a voltage is applied to the electrodes 204 while the water 120 flows through the device 200 in the flow direction 232. As shown in FIG. 4, a positive voltage 230 is applied to the electrode 204 in the first region 250 while a negative voltage 230' is applied to the electrode 204 in the second region 254. In the first operating state, the first target ions 116 are intercalated into the intercalation host material 112 of the electrode 204 in the second region 254, which decreases the concentration of the first target ions 116 in the second region 254. Conversely, the first target ions 116 are released from the intercalation host material 112 of the electrode 204 in the first region 250, which increases the concentration of the first target ions 116 in the first region 250. The increased concentration of the first target ions 116 in the first region 250 also has the effect of causing a transfer of the second target ions 144 from the second region 254 into the first region 250, thereby decreasing the concentration of the second target ions 144 in the second region 254. Due to the separation of the first target ions 116 and the second target ions 144 in the first operating state, the water 120 exiting the device 200 from the second region 254 will be the softened water while the water exiting the device 200 from the first region 250 will constitute the wastewater stream.

Figure 7:
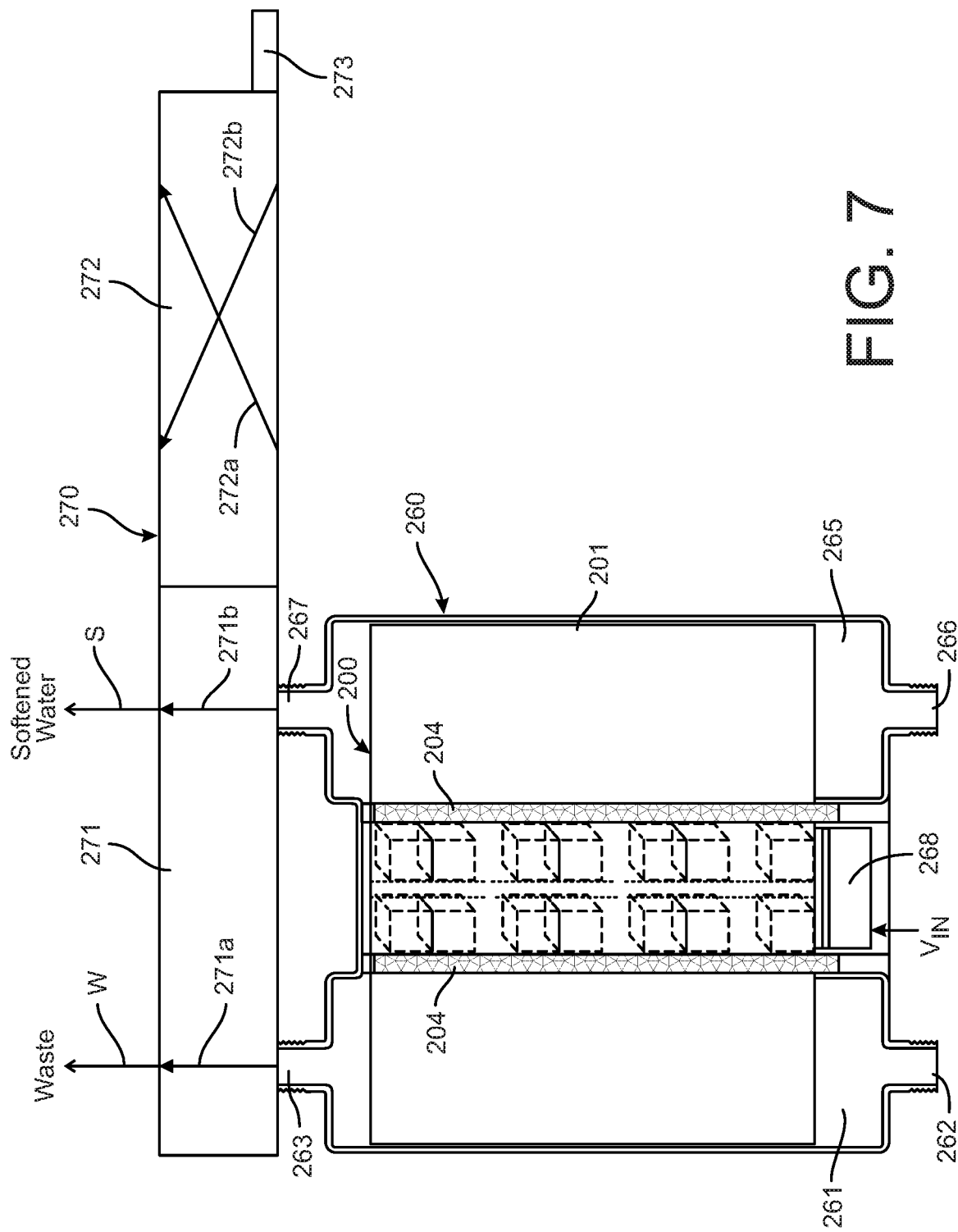
FIG. 7 depicts a cartridge embodiment of the device shown in FIGS. 5-6 in which the cartridge is supported within a housing integrated into a water supply system for a dwelling or building.

FIG. 7 illustrates the device 200 in a second operating state in which the voltage applied to the electrodes 204 is reversed. In particular, the negative voltage 230' is applied to the electrode 204 in the first region 250 while the positive voltage 230 is applied to the electrode 204 in the second region 254. In the second operating state, the first target ions 116 are intercalated into the intercalation host material 112 of the electrode 204 in the first region 250, which decreases the concentration of the first target ions 116 in the first region 250. Conversely, the first target ions 116 are released from the intercalation host material 112 of the electrode 204 in the second region 254, which increases the concentration of the first target ions 116 in the second region 254. The increased concentration of the first target ions 116 in the second region 254 also has the effect of causing a transfer of the second target ions 144 from the first region 250 into the second region 254, thereby decreasing the concentration of the second target ions 144 in the first region 250. Due to the separation of the first target ions 116 and the second target ions 144 in the second operating state, the water 120 exiting the device 200 from the first region 250 will be the softened water while the water exiting the device 200 from the second region 254 will constitute the wastewater stream.

The device 200 can be provided as a cartridge 201 mounted within a housing 260 configured to be integrated into the water supply system of a dwelling or building, in a manner similar to the housing 152 described above. However, since the device 200 includes two discrete regions 250, 254 that alternate between a softened water flow path and a waste flow path, the housing 260 defines two discrete chambers 261, 265, each having a respective inlet fitting 262, 266 and outlet fitting 263, 267. The housing is configured to preserve the integrity of the two chambers and regions 250, 254 to prevent cross-contamination. A controller 268 is provided that is connected to a current source $V_{IN}$ and to each of the electrodes 204 to selectively apply a positive voltage, negative voltage or no voltage to the electrodes according to one of the three operating states described above. Since the two regions alternatively flow softened water and waste water through them, depending on the operating state, the outputs of the two chambers 261, 265 of the housing are fed to a two position valve assembly 270. A first element 271 of the valve assembly provides a direct connection 271a between the left chamber 261 and a waste outlet W, and a direct connection 271b between the right chamber 265 and a soft water outlet S. The second element 272 of the valve assembly crosses the connections, thereby providing a direct connection 272a between the left chamber 261 and a softened water outlet S, and a direct connection 272b between the right chamber 265 and a waste outlet W. A valve controller 273, such as an electrical solenoid, is provided to selectively move the valve assembly into one of the two positions. The valve controller 273 is tied to the controller 268 that selectively energizes the electrodes 204 to coordinate the action of the electrodes with the action of the valve assembly for each operating state. Thus, when the device 200 is in the second operating state shown in FIG. 5, the valve assembly is activated to position the first element 271 between the outlets of the housing and the waste outlet W and softened water outlet S, as depicted in FIG. 7. When the controller 268 activates the device in the third operating state, the valve controller 273 activates the valve assembly so that the second element 272 is aligned between the housing outlets 263, 267 and the waste outlet W and softened water outlet S.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A device for removing ions from a flow of water comprising:
   a first electrode connectable to a current source and configured to be arranged in a flow of water; and
   a counter-electrode connectable to the current source and configured to be arranged in the flow of water opposite said first electrode,
   wherein said first electrode contains at least one material which is capable of intercalating one or both of $Mg^{2+}$ and $Ca^{2+}$ ions in the flow of water,
   wherein the at least one material is selected from the group consisting of:
   $A_xMnFe(CN)_6$ (A=Li,Na,K,Cs) $0 \leq x \leq 1$; $A_xMnMn(CN)_6$ (A=Li,Na,K,Cs) $0 \leq x \leq 1$; $A_xZnFe(CN)_6$ (A=Li,Na,K,Cs) $0 \leq x \leq 1$; $A_xBaFe(CN)_6$ (A=Li,Na,K,Cs) $0 \leq x \leq 1$; $A_xFeFe(CN)_6$ (A=Li,Na,K,Cs) $0 \leq x \leq 1$; $A_xNiFe(CN)_6$ (A=Li,Na,K,Cs) $0 \leq x \leq 1$; $Ti_xFe_{1-x}[Fe(CN)_6]_{0.96}$ $0 \leq x \leq 1$; polyimide; $NaMnFe_2(PO_4)_3$; $Na_3Fe_3(PO_4)_4$; $Na(M)PO_4$, M=Fe, Mn, or $Fe_xMn_{1-x}$ $0 \leq x \leq 1$; $ZnMn_2O_4$; $MgFeSiO_4/C$; $Mg_xMn_{2-x}SiO_4$, $0 \leq x \leq 2$; $Mg_{0.5}Ti_2(PO_4)_3$; $LiTi_2(PO_4)_3$; $Ti_xAl_{2-x}(PO_4)_3$, $0 \leq x \leq 2$; $TiP_2O_7$; $Na_3MnTi(PO_4)_3$; $K_2Ti_4O_9$; $CaMO_3$ (M=Mn and/or Fe); potassium terephthalate; 2,5-pyridinedicarboxylate ($K_2PC$); $KFeF_3$; $KMg_xFe_{2-x}(PO_4)_2$, $0 \leq x \leq 2$; $NaTi_2(PO_4)_3$; $Na_2FeP_2O_7$; and $Na_2Ti_3O_7$.

2. The device of claim 1, wherein the counter-electrode includes a material capable of binding anions in the flow of water to the counter-electrode.

3. The device of claim 2, wherein the counter-electrode material is capable of binding one or both of Cl and $CO_3^{2-}$ anions in the flow of water to the counter-electrode.

4. The device of claim 3, wherein the counter-electrode material includes a porous carbon layer.

5. The device of claim 2, wherein the counter-electrode includes an ion-selective membrane arranged on said counter-electrode to be between the counter-electrode material and the flow of water.

6. The device of claim 1, further comprising a non-conductive water permeable separator arranged to be disposed in the flow of water between said first electrode and said counter-electrode.

7. The device of claim 1, wherein said counter-electrode contains at least one material which is capable of intercalating one or both of $Mg^{2+}$ and $Ca^{2+}$ ions in the flow of water.

8. The device of claim 7, wherein the at least one material of the counter-electrode is selected from the group consisting of: $A_xCuFe(CN)_6$ $A_xMnFe(CN)_6$ (A=Li,Na,K,Cs) $0 \leq x \leq 1$; $A_xMnMn(CN)_6$ (A=Li,Na,K,Cs) $0 \leq x \leq 1$; $A_xZnFe(CN)_6$ (A=Li,Na,K,Cs) $0 \leq x \leq 1$; $A_xBaFe(CN)_6$ (A=Li,Na,K,Cs) $0 \leq x \leq 1$; $A_xFeFe(CN)_6$ (A=Li,Na,K,Cs) $0 \leq x \leq 1$; $A_xNiFe(CN)_6$ (A=Li,Na,K,Cs) $0 \leq x \leq 1$; $Ti_xFe_{1-x}[Fe(CN)_6]_{0.96}$ $0 \leq x \leq 1$; polyimide; $NaMnFe_2(PO_4)_3$; $Na_3Fe_3(PO_4)_4$; $Na(M)PO_4$, M=Fe, Mn, or $Fe_xMn_{1-x}$ $0 \leq x \leq 1$; $ZnMn_2O_4$; $MgFeSiO_4/C$; $Mg_xMn_{2-x}SiO_4$, $0 \leq x \leq 2$; $Mg_{0.5}Ti_2(PO_4)_3$; $LiTi_2(PO_4)_3$; $Ti_xAl_{2-x}(PO_4)_3$, $0 \leq x \leq 2$; $TiP_2O_7$; $Na_3MnTi(PO_4)_3$; $K_2Ti_4O_9$; $CaMO_3$ (M=Mn and/or Fe); potassium terephthalate; 2,5-pyridinedicarboxylate ($K_2PC$); $KFeF_3$; $KMg_xFe_{2-x}(PO_4)_2$, $0 \leq x \leq 2$; $NaTi_2(PO_4)_3$; $Na_2FeP_2O_7$; and $Na_2Ti_3O_7$.

9. The device of claim 1, further comprising an ion exchange membrane between said first electrode and said counter-electrode.

10. The device of claim 9, wherein the ion exchange membrane is an anion exchange membrane.

11. The device of claim 9, wherein the ion exchange membrane is a cation exchange membrane.

12. The device of claim 1, wherein said first electrode includes:
    a conductive substrate;
    and a layer on said substrate including said at least one material, an electrically conductive additive and a binder.

13. The device of claim 12, wherein said electrically conductive additive is a carbon composition.

14. The device of claim 12, wherein said binder is a polyvinylidene difluoride (PVDF).

15. The device of claim 14, wherein said layer includes said at least one material in 60-85 wt. %, said PVDF binder in 5-35 wt. % and a carbon composition as said electrically conductive additive in 3-10 wt. %.

\* \* \* \* \*